United States Patent [19]

Hahn et al.

[11] Patent Number: 4,611,987
[45] Date of Patent: Sep. 16, 1986

[54] APPARATUS FOR FORMING MULTILAYER THERMOPLASTIC RESIN EXTRUSIONS

[75] Inventors: Granville J. Hahn; Raleigh N. Rutledge, both of Big Spring; Marion Johnson, Baytown; Jackie D. Murley; Carl Blanchard, both of Big Spring, all of Tex.

[73] Assignee: Cosden Technology, Inc., Dallas, Tex.

[21] Appl. No.: 633,767

[22] Filed: Jul. 23, 1984

[51] Int. Cl.⁴ ............................................. B29C 47/30
[52] U.S. Cl. ................. 425/131.1; 264/171; 425/192 R; 425/462
[58] Field of Search ............... 264/171, 75; 425/131.1, 425/462, 192 R

[56] References Cited

U.S. PATENT DOCUMENTS

| | | | |
|---|---|---|---|
| 3,415,920 | 12/1968 | Lee et al. | 425/133.5 |
| 3,473,193 | 10/1969 | Quackenbush et al. | 425/133.5 |
| 3,743,459 | 7/1973 | Schrenk et al. | 425/462 |
| 3,743,460 | 7/1973 | Woolridge | 425/133.5 |
| 3,918,865 | 11/1975 | Nissel | 425/131.1 |
| 4,144,011 | 3/1979 | Sponaugle | 425/133.5 |
| 4,165,210 | 8/1979 | Corbett | 425/133.5 |
| 4,405,547 | 9/1983 | Koch et al. | 425/133.5 |
| 4,443,397 | 4/1984 | Hahn et al. | 425/131.1 |
| 4,483,669 | 11/1984 | Hahn et al. | 425/131.1 |
| 4,483,812 | 11/1984 | Hahn et al. | 425/131.1 |

FOREIGN PATENT DOCUMENTS 1353932 5/1974 United Kingdom ............... 264/171

*Primary Examiner*—Jeffery Thurlow
*Attorney, Agent, or Firm*—Roy L. Van Winkle; M. Norwood Cheairs

[57] ABSTRACT

An injector device for use in forming multilayer extrusions of plastic resins and a method for forming such extrusions. The apparatus includes an injector member that divides the extrudate from the first extruder into two layers and receives at least one extrudate from an additional extruder that is interposed by the injector member between the divided layers of the extrudate from the first extruder. The process includes producing plasticized resin by a first extruder, dividing the extrudate into two layers, producing extrudate from a second extruder, and injecting such extrudate between the two layers of the first extrudate.

1 Claim, 7 Drawing Figures

APPARATUS FOR FORMING MULTILAYER THERMOPLASTIC RESIN EXTRUSIONS

BACKGROUND OF THE INVENTION

This invention relates generally to improved apparatus and methods for forming multilayer thermoplastic resin extrusions. More particularly, but not by way of limitation, this invention relates to improved apparatus that includes an injector for dividing a stream of thermoplastic resin and injecting a second stream of thermoplastic resin between the layers of the first thermoplastic resin. It also pertains to an improved method of producing multilayer, thermoplastic resin extrusions wherein a first plasticized resin is formed simultaneously with a second plasticized resin and the first resin is divided into two layers with the second resin being injected between the layers of the first resin.

In the past, a number of different methods and apparatus have been utilized for the purpose of producing multilayer extrusions of thermoplastic resins. In general, the method utilized has been to produce a main stream of base resin, produce a second resin and divide the second resin into two streams which are then placed on the outside of the base resin. Additional layers can be placed on the outside of the first three layers if desired. However, because of the temperatures and pressures involved in the extrusion process and due to the bulk of the apparatus needed to handle the resin layers and such pressures and temperatures, there is a practical limit imposed upon the number of layers that can be placed on the resin in the foregoing manner. Such apparatus and methods are illustrated in copending applications Ser. No. 485,141, filed Apr. 15, 1983, entitled Improved Multi-Layered Sheeting Apparatus and Process Therefor, (now U.S. Pat. No. 4,483,669 issued Nov. 20, 1984.) and Ser. No. 485,550 filed Apr. 15, 1983 and entitled Valve Plate and Feedback Design for Co-extrusion Apparatus and Co-extrusion Process Using Same, (now U.S. Pat. No. 4,483,812 issued Nov. 20, 1984.) both of which are assigned to the assignee of this application.

While the aforedescribed apparatus and methods have worked with a substantial degree of success, it has become desirable to produce multilayer resins wherein five or more layers of various resins are fairly common and up to nine layers of resin are being requested or needed to contain certain products.

SUMMARY OF THE INVENTION

Therefore, it is an object of this invention to provide an improved method and apparatus for forming multilayer, thermoplastic resin extrusions by injecting additional layers internally of the "main" resin stream. The layers can be injected simultaneously and in a telescoped fashion with layers that are placed on the exterior of the "main" stream by the apparatus mentioned above.

This invention provides improved apparatus for forming multilayer, thermoplastic resin extrusions comprising a first extruder for plasticizing a first thermoplastic resin; a second extruder for plascizing a second thermoplastic resin; a die for shaping the multilayer resins to the desired configuration; and an injector in fluid communication with the first extruder and die for separating the first plasticized resin passing therethrough into a pair of layers, the injector having a slot therein whereby a layer of the second plasticized resin is placed between the layers of the first plasticized resin as the resins move past the injector toward the die.

BRIEF DESCRIPTION OF THE DRAWING

The foregoing and additional objects and advantages of the invention will become more apparent as the following detailed description is read in conjunction with the accompanying drawing wherein like reference characters denote like parts in all views and wherein.

DETAILED DESCRIPTION OF THE PREFERRED EMBODIMENT

Figure 1:
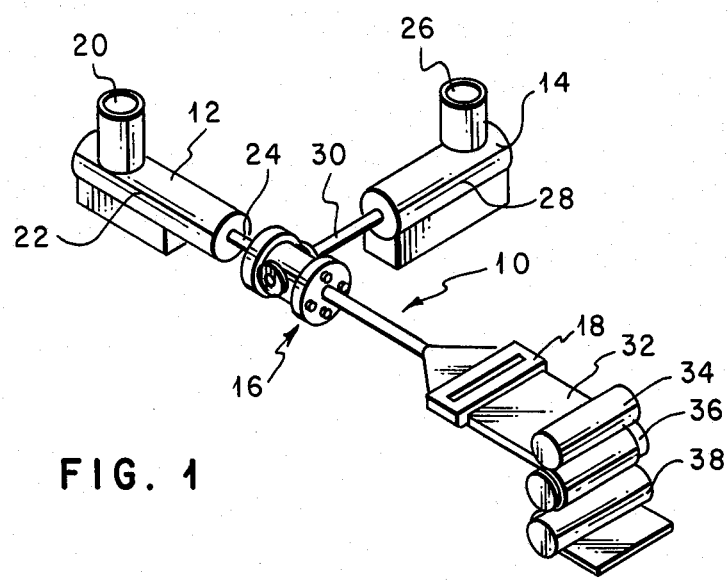
FIG. 1 is a perspective view illustrating schematically, apparatus constructed in accordance with the invention that is useful in carrying out the method of the invention.

Referring to the drawing and to FIG. 1 in particular shown therein and generally designated by the reference character 10 is an apparatus for producing the multilayer extusions of thermoplastic resins. As illustrated, the apparatus 10 includes an extruder 12 and an extruder 14 that are connected, as will be explained in detail, by injector assembly 16 with a die 18.

The extruder 12 includes an inlet 20 for receiving the thermoplastic resin, a housing 22 having an extruder screw (not shown) journaled therein for moving the thermoplastic resin from the inlet 20 to an outlet 24. The outlet 24 is connected to the injector assembly 16. The extruder 12 also includes a heater (not shown) for elevating the temperature of the thermoplastic resin so that as the resin leaves the extruder 12 through the outlet 24, it will be in plasticized form.

The extruder 14 includes an inlet 26 for receiving thermoplastic resin, a housing 28 that journals an extruder screw (not shown) to move materials from the inlet 26 to an outlet 30 which is connected to the injector assembly 16. The extruder 14 also includes a heating element (not shown) for raising the temperature of the thermoplastic resin so that it will be plasticized at the outlet 30.

As illustrated in FIG. 1, the thermostatic resins leave the die 18 in the form of a sheet 32 which passes through sizing rolls 34, 36, and 38 to a storage roll (not shown). The configuration of die can be selected to produce the desired final configuration.

Figure 2:
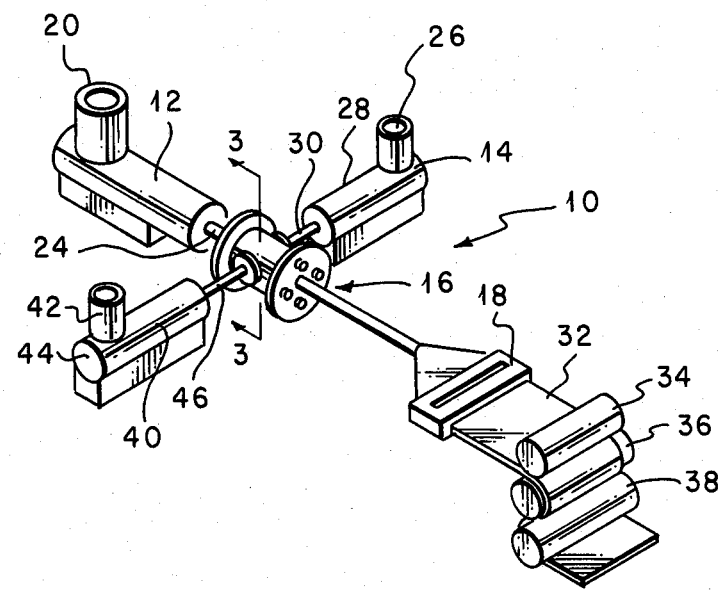
FIG. 2 is a view similar to FIG. 1, but illustrating the system including an additional extruder.

FIG. 2 illustrates the apparatus previously described in FIG. 1, but also includes a third extruder 40 that has an inlet 42 for receiving thermoplastic material, a housing 44 that journals an extruder screw (not shown) to move the resin from the inlet 42 to an outlet 46 that is connected to the injector assembly 16. It can be appreciated by viewing FIGS. 1 and 2 that additional extruders could be incorporated in the apparatus 10 if it is necessary or desirable to have additional layers formed in the multilayer extrudate produced by the apparatus.

Figure 4:
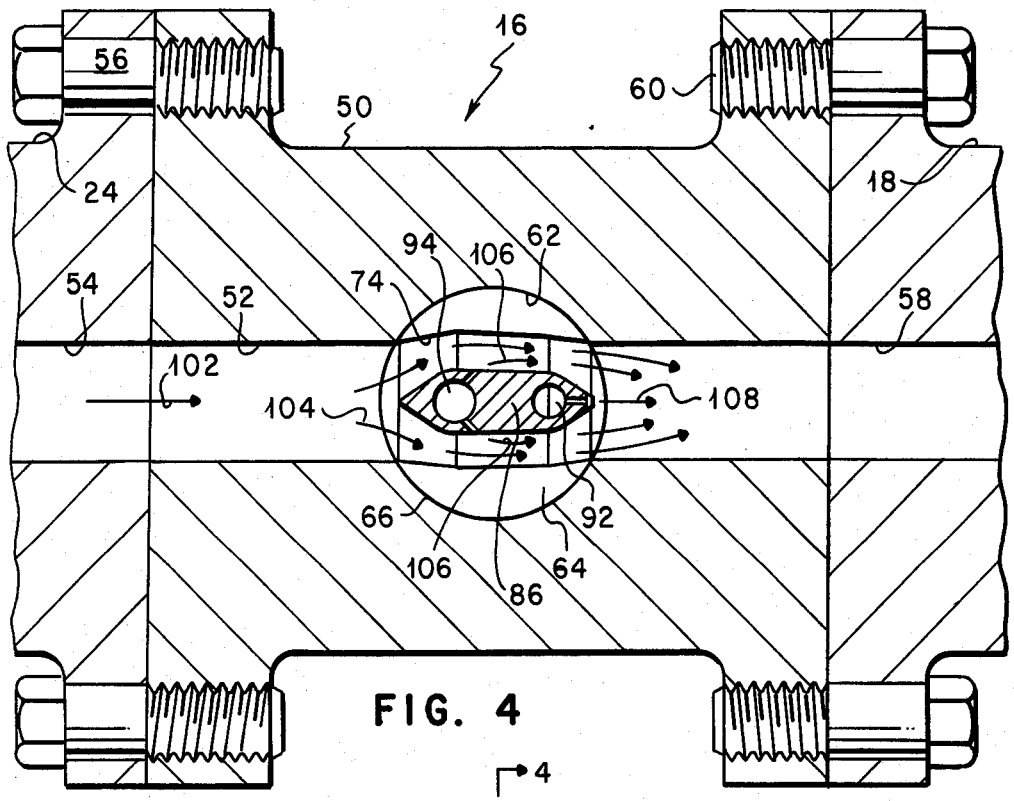
FIG. 4 is a cross-sectional view taken generally along the line 4—4 of FIG. 3.
Figure 3:
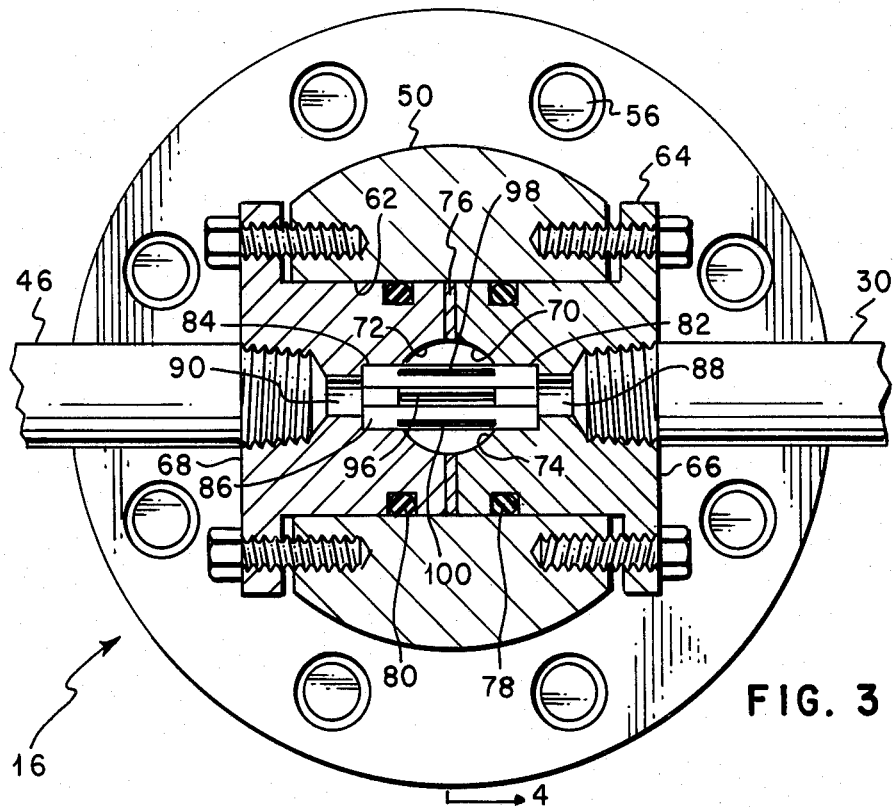
FIG. 3 is an enlarged transverse, cross-sectional view taken generally along the line 3—3 of FIG. 2 and illustrating injection apparatus that is constructed in accordance with the invention.

FIGS. 3 and 4 illustrate in more detail the structure of the injector assembly 16. As illustrated therein, the injector assembly 16 includes an injector housing 50 which has a flow passageway 52 extending therethrough. The flow passageway 52 is in fluid communication with a flow passageway 54 that is in the outlet 24 of the extruder 12. Injector housing 50 is connected by fasteners 56 with the outlet 24 of the extruder 12.

The flow passageway 52 is also in communication with the flow passageway 58 that extends into the die 18. The housing 50 is connected by threaded fasteners 60 with the die 18.

Injector housing 50 also includes a transverse bore 62 that intersects the flow passageway 52 and extends completely through the housing 50. Disposed in the transverse bore 62 is a transverse injector housing 64. The transverse housing 64 has been divided for manufacturing convenience into two member 66 and 68.

The member 66 is provided with a recess 70 and the member 68 is provided with a recess 72. The recesses are located in the ends of the members that are adjacent to each other and, the recesses 70 and 72, taken together, form a flow passageway 74 that extends through the tranverse housing 64 to complete the flow passageway 52 through injector housing 50. It will be noted that a seal member 76 is provided between the unrecessesed end portions of the members 66 and 68. Also, seals 78 and 80 encircle the members 66 and 68, respectively, providing a seal between the tranverse member 64 and the injector housing 50 on each side of the passageway 74.

The members 66 and 68 are also provided with recesses 82 and 84, respectively, to receive the ends of an injector member 86 and to retain the injector member 86 in a position where it extends across the passageway 74. The transverse housing member 66 also includes a port 88 that is in fluid communication with the outlet 30 of the extruder 14. Similarly, the transverse housing member 68 includes a port 90 that is in fluid communication with the outlet 46 from the extruder 40. The port 88 is also in fluid communication with a cavity 92 formed in the injector member 86 and the port 90 is in fluid communication with a cavity 94 that is also formed in the injector member 86.

Figure 7:
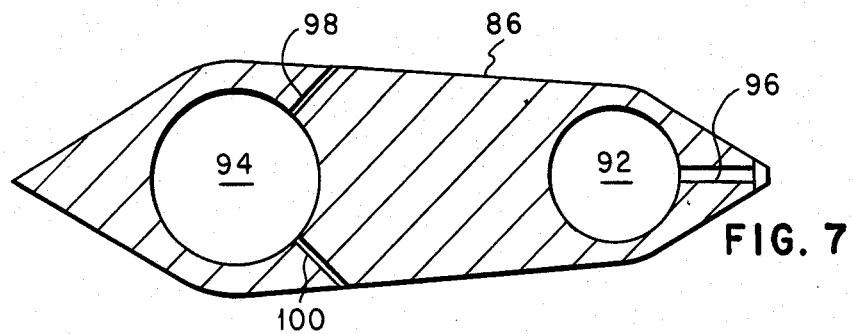
FIG. 7 is a cross-sectional view taken generally along the line 7—7 of FIG. 5.
Figure 5:
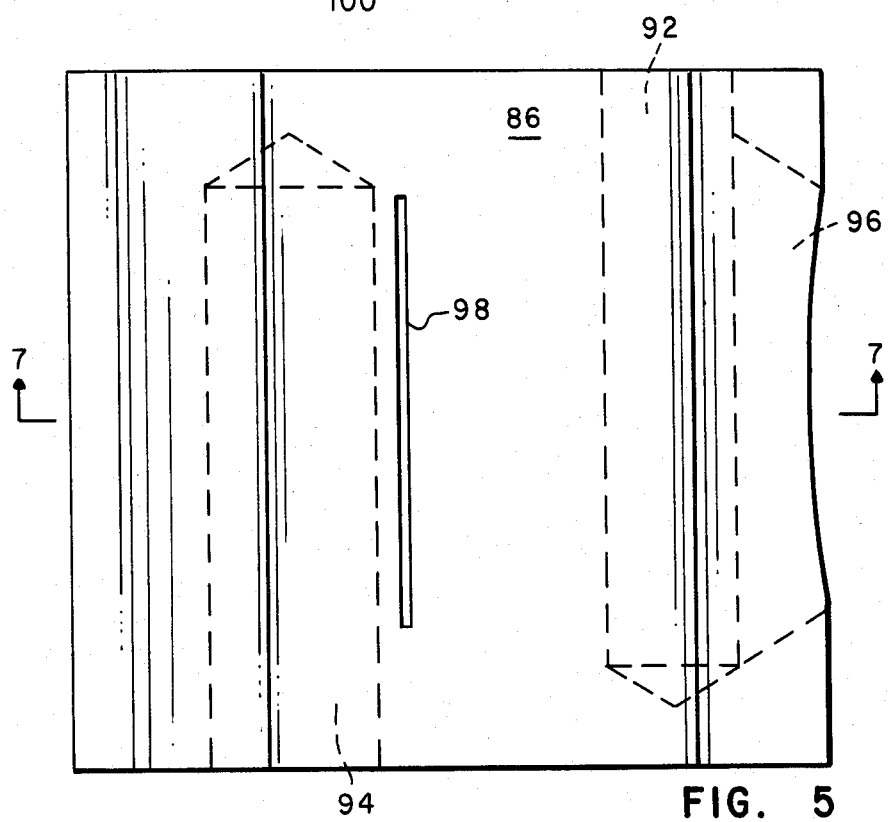
FIG. 5 is a top plan view of an injector member that is constructed in accordance with the invention.
Figure 6:
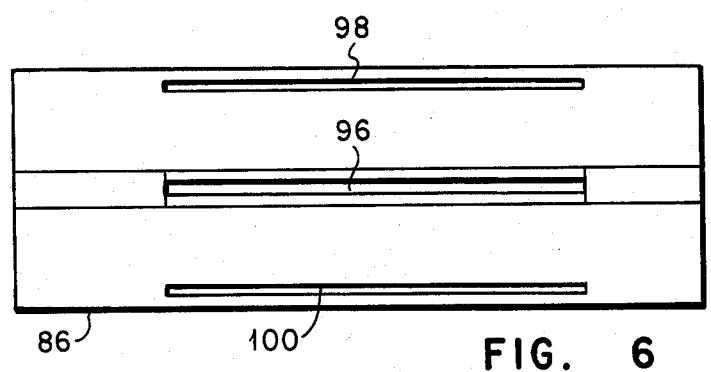
FIG. 6 is an end view of the injector of FIG. 5.

FIGS. 5 through 7 illustrates the structure of the injector member 86 much more clearly. In addition to the cavities 92 and 94, the injector member 86 also includes a slot 96 that extends from the cavity 92 through the downstream end of the injector member 86. The cavity 94 is in fluid communication with a pair of slots 98 and 100 that extend through the injector member 86 as illustrated.

While the slots 96, 98 and 100 are illustrated as being substantially the same size, that is, having approximately the same thickness and length or flow area, it will be understood that the particular slot sizes can be varied to accomodate thermoplastic resins having different viscosities at the process temperature being used. The resins, due to their various vicosities and due to the desirability of producing different thicknesses in the resin layers, will respond differently to pressure and temperature and thus, the flow areas of the slots will need to be varied.

In operation, the extruder 12 is producing a plasticized thermoplastic resin through the flow passageway 54 in the outlet 24. Since the flow passageway 54 is in communication with the flow passageway 52 in the housing 16, the flow therethrough is as indicated by the arrow 102. Upon reaching injector member 86, the resin stream is divided into two layers as illustrated by the arrows 104. Extrudate from the extruder 40 flows into the cavity 94 in the injector member 86 and outwardly through the slots 98 and 100 into the flow passageway as indicated by the arrows 106. At this stage, there are four layers of thermoplastic resin flowing together through the flow passageway 74 in the injector housing 50.

At the downstream end of the injector member 86, extrudate from the extruder 14 is flowing from the cavity 92 through the slot 96 as indicated by the arrow 108. As can now be appreciated, there are five separate layers of thermoplastic resin flowing through the flow passageway 52 and entering the passageway 58 in the inlet to the die 18. Thus, the sheet 32, after this process, consists of five layers of thermoplastic resin with the outer two layers being the material produced by the extruder 12, the next inner layers consist of the resin produced by the extruder 40 and the final inner layer is the resin produced by the extruder 14.

If the final extruded resin product is to include only three layers, the extruder 40 is not used. The two outer layers are produced by the extruder 12 and the inner layer produced by the extruder 14 with the resin entering the flow stream through the cavity 92 and slot 96 in the injector member 86.

There are many resins that can be utilized in producing a product having multilayers. A three layer product could include a copolymer consisting of both polypropylene and polyethylene while the inner layer could be a resin such as polyvinylidene chloride. The copolymer will provide both good hot-fill strength and cold fracture resistance while the polyvinylidene cloride will provide a good barrier.

By way of further example, a five layer resin product could include the aforementioned copolymer on the outer layers and a resin such as ethylene vinyl alcohol on the inner layer. The ethylene vinyl alcohol is an excellent $CO_2$ and oxygen barrier material, but it does not adhere well to the copolymer. Therefore, the layers between the ethylene vinyl alcohol and the copolymer may be ethylene vinyl acetate which is a good adhesive for both the ethylene vinyl alcohol and the copolymer. Of course many other resins could be used in various combinations as desired or necessary to meet the requirement of the final use of the product.

It will be appreciated from the foregoing detailed description that the apparatus described herein will produce multilayer extrusions of thermoplastic resins. Also, the apparatus described produces such multilayer resins in a relatively small space which can be carefully controlled with respect to both temperature and pressure and which will produce the desired number of layers in the desired thicknesses, etc.

Having described the apparatus in detail, it will be understood that many changes and modifications can be made thereto without departing from the spirit of the invention or from the scope of the annexed claims.

What is claimed:

1. Improved apparatus for forming multilayer, thermoplastic resin extrusions, comprising in combination:
   first extruder means for plasticizing a first thermoplastic resin;
   second extruder means for plasticizing a second thermoplastic resin;
   die means for shaping said multilayer resins to the desired configuration;

injector means in fluid communication with said first and second extruder means and with said die means, said injector means including injector housing means having a resin flow passageway extending therethrough and a transverse passageway extending therethrough intersecting said flow passageway;

first and second transverse housing members removeably located in said transverse passageway in sealing engagement with said injector housing means on each side of said flow passageway, said transverse housing members having recesses in juxtaposed ends thereof forming a portion of said flow passageway, having second recesses in each said end adjacent to said flow passageway and having a port extending into one of said second recesses;

means connecting the port in said transverse housing member to said second extruder means for receiving plasticized resin therefrom; and, an injector body member removeably located in said second recesses supported by said housing members and extending across said flow passageway whereby said first plasticized resin is divided into two layers, said body member having a cavity therein in fluid communication with said port and having a slot extending into said cavity whereby a layer of said second plasticized resin can be deposited between said divided layers of said first plasticized resin.

* * * * *